No. 780,173. PATENTED JAN. 17, 1905.
C. J. W. HAYES.
MACHINE FOR EXPANDING METAL.
APPLICATION FILED JUNE 6, 1904.

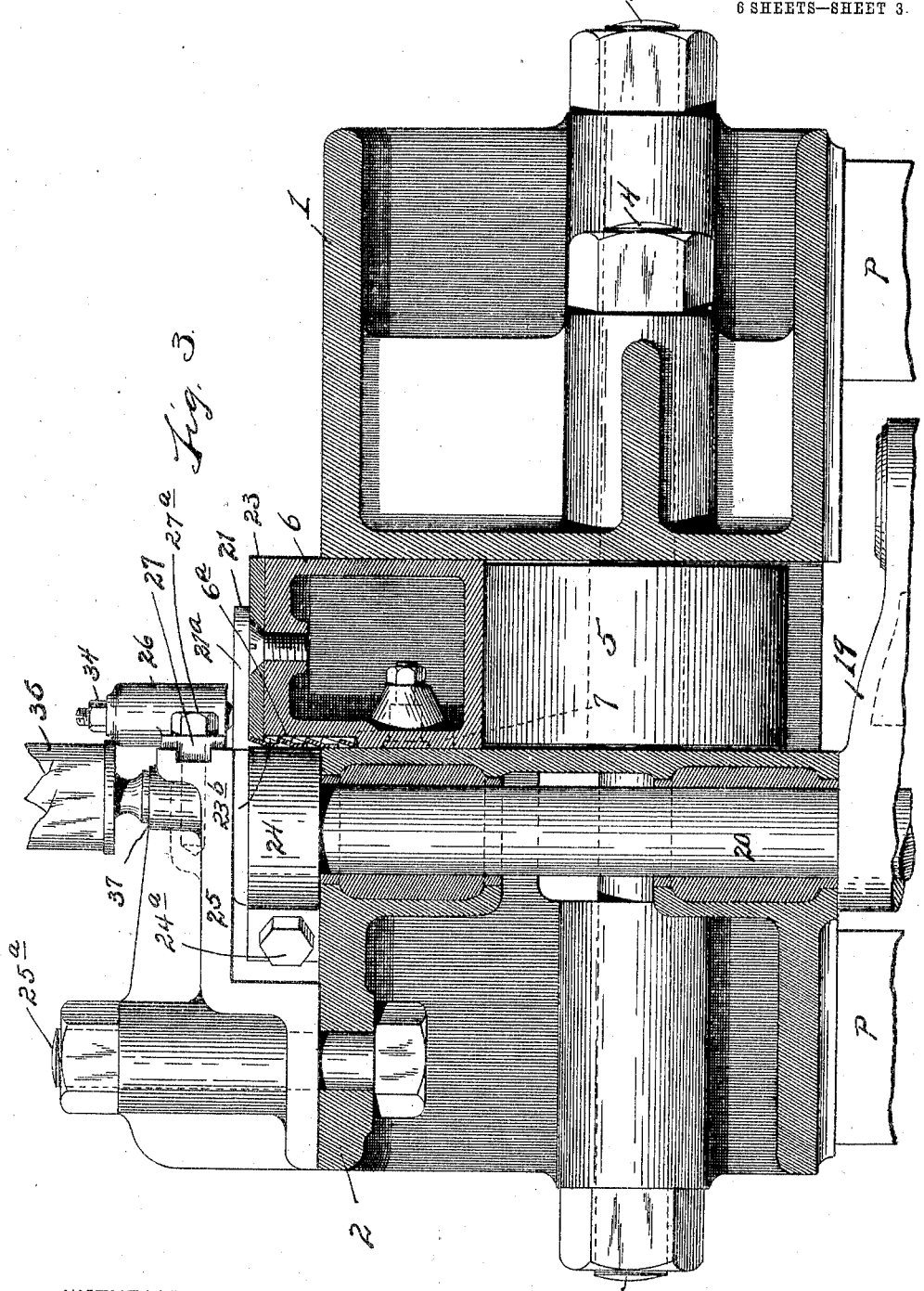

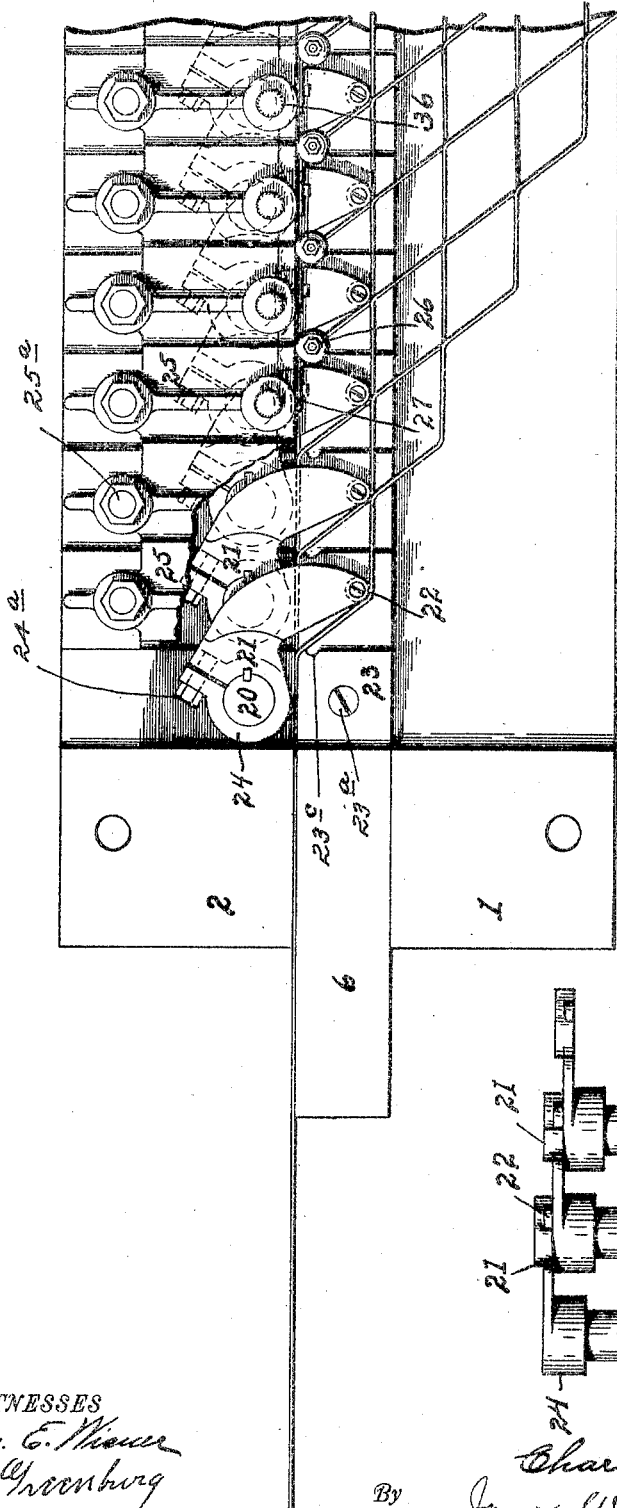

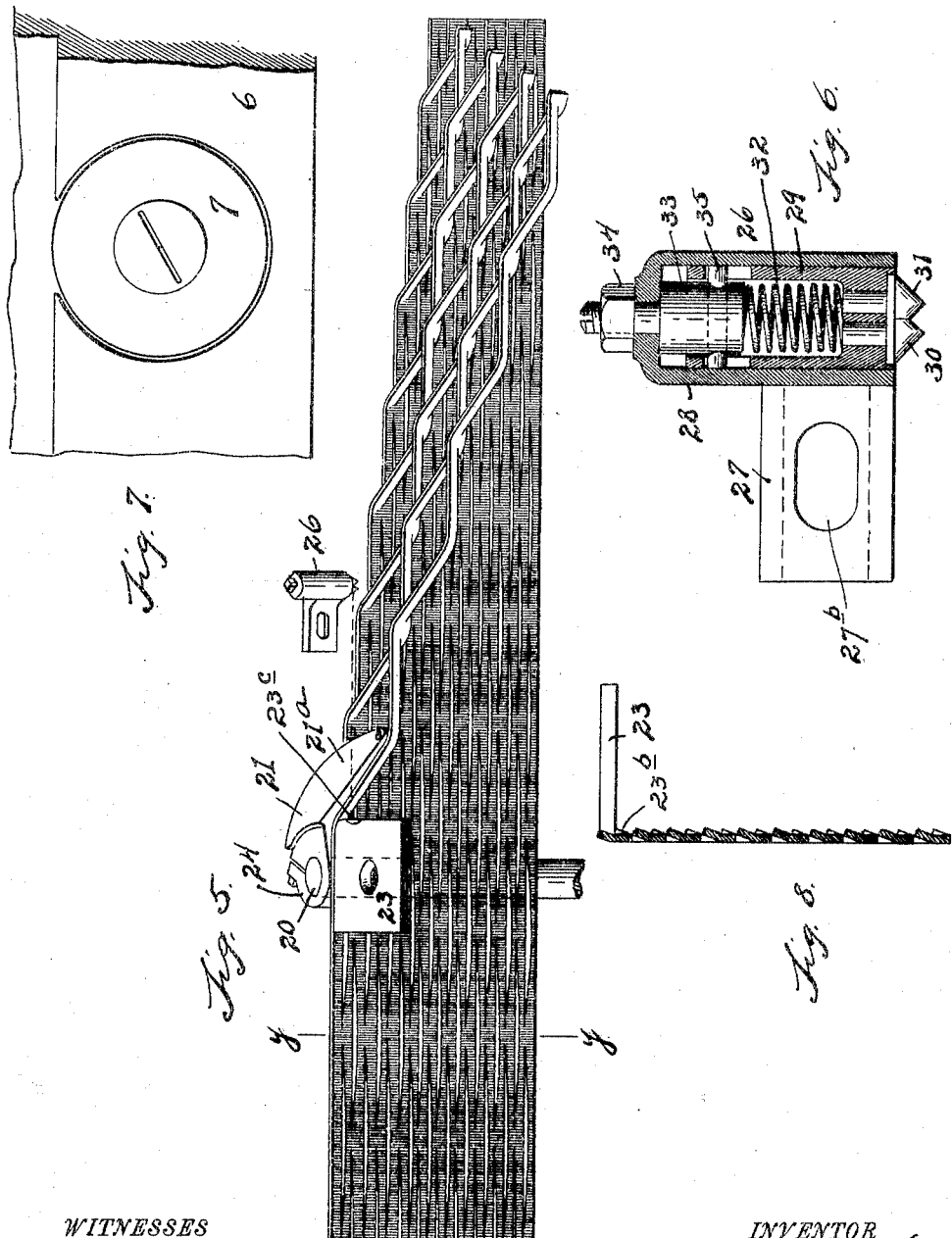

6 SHEETS—SHEET 6.

WITNESSES
Chas. E. Wiener
W. A. Greenburg

INVENTOR
Charles J. W. Hayes
By James Whittemore
Attorney.

No. 780,173.        Patented January 17, 1905.

UNITED STATES PATENT OFFICE.

CHARLES J. W. HAYES, OF DETROIT, MICHIGAN, ASSIGNOR TO FRANK P. CLEVELAND, TRUSTEE, OF DETROIT, MICHIGAN.

MACHINE FOR EXPANDING METAL.

SPECIFICATION forming part of Letters Patent No. 780,173, dated January 17, 1905.

Application filed June 6, 1904. Serial No. 211,418.

*To all whom it may concern:*

Be it known that I, CHARLES J. W. HAYES, a citizen of the United States, residing at Detroit, in the county of Wayne and State of Michigan, have invented certain new and useful Improvements in Machines for Expanding Metal, of which the following is a specification, reference being had therein to the accompanying drawings.

This invention relates to machines for making expanded metal; and its object is to provide apparatus for making the metal in greater lengths as well as much more expeditiously and with a lesser expenditure of power than heretofore.

Most machines with which I am acquainted both slit and expand the metal; but the operation of this machine is wholly confined to the expansion of the metal after treatment by a slitting mechanism which is the subject-matter of separate application. The metal now on the market is usually in lengths of eight feet, and in spaces of sixteen feet or more the metal has to be spliced, which results in both a waste of metal and labor, while the machine here shown will expand metal in as long strips as can be rolled or would make a continuous expanded sheet if the blanks were welded before passing through the slitting-machine.

Figure 1:
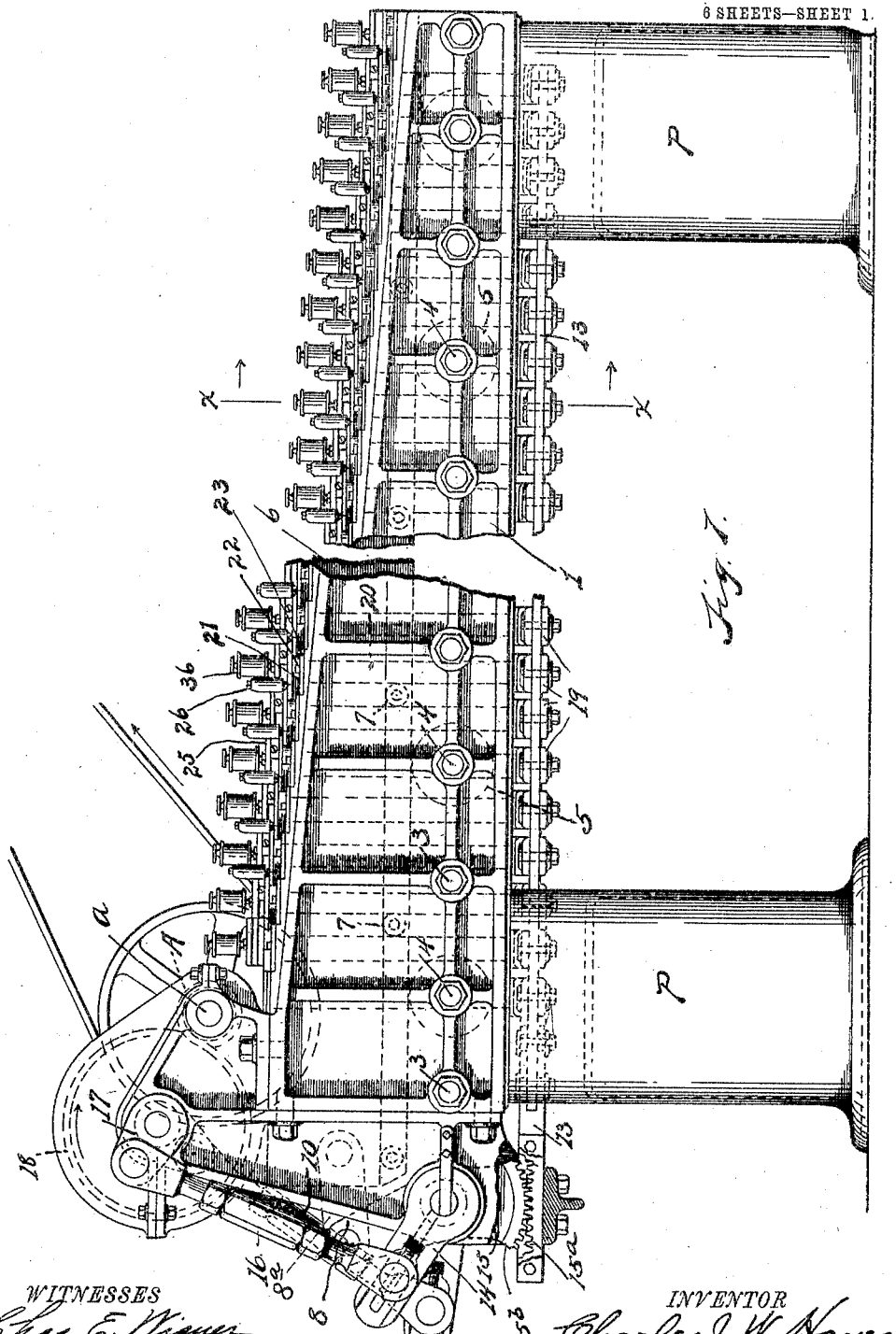
Figure 2:
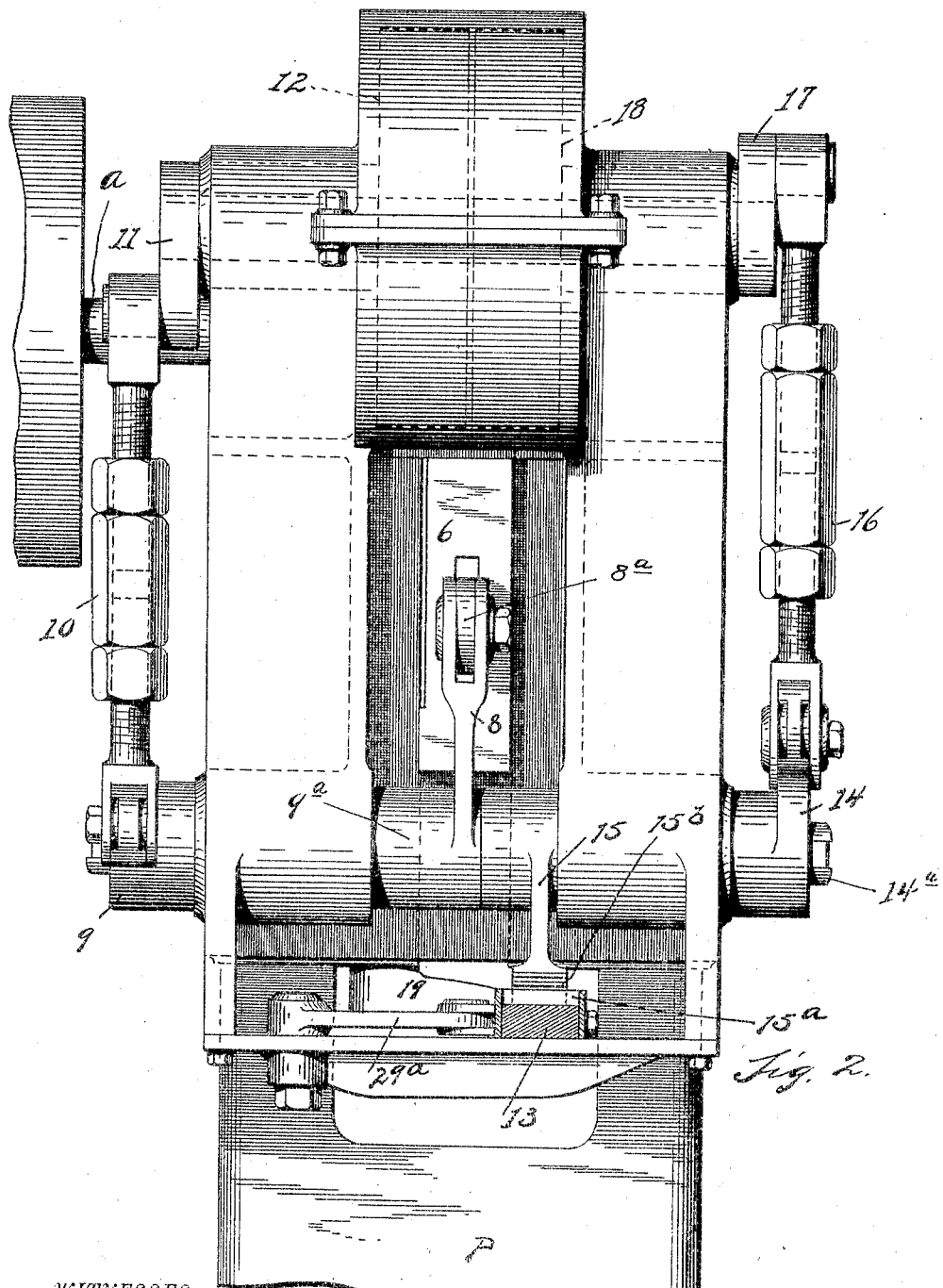
Figure 9:
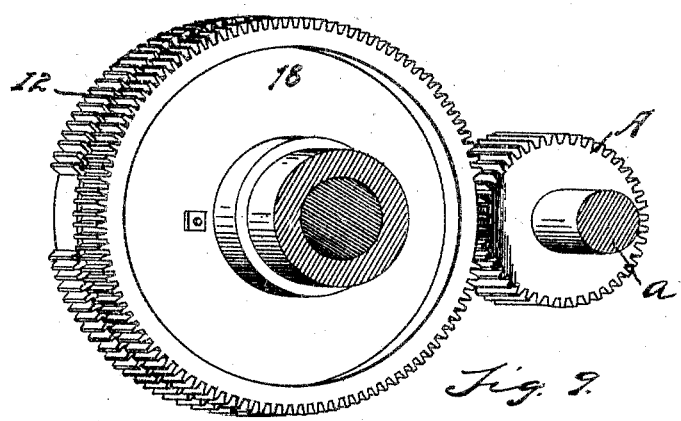
Figures 10, 11:
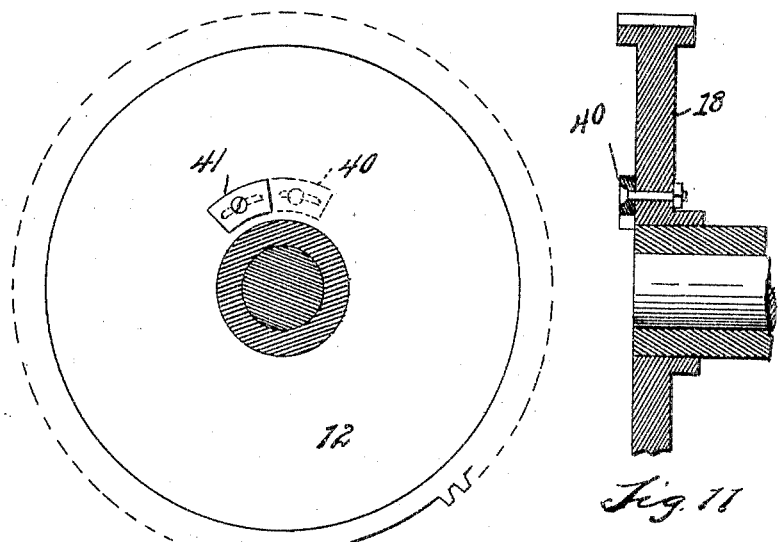

In the drawings, Figure 1 is a side elevation of the machine with the central part broken away in order to show both ends of the machine. Fig. 2 is a front elevation showing the end of the machine which appears at the left of Fig. 1. Fig. 3 is an enlarged cross-section at X X of Fig. 1. Fig. 4 is a plan view of a portion of front end of the machine, showing the expanders. Fig. 5 is an octographic projection showing the action of an expander and the location of a detent upon the metal. Fig. 6 is a full-sized section of a detent. Fig. 7 shows the supporting-roll on the carriage on which the metal is carried. Fig. 8 is a section at *y y* of Fig. 5 and shows the appearance of a cross-section of the metal to be expanded after passing through the slitting-machine. The thickness of the metal is greatly exaggerated in proportion to width of sheet shown. Fig. 9 is a perspective view showing the operating-gears. Fig. 10 shows the interaction of the two mutilated gears of Fig. 9. Fig. 11 is a cross-section of one of the gearwheels. Fig. 12 is an elevation showing the expanding-fingers. These are shown in same position as in Fig. 4.

In general construction the machine comprises a frame consisting of the parallel beams 1 and 2, supported upon the pillars P, said beams being spaced from each other and connected by bolts 3. Between the beams 1 and 2 is arranged a reciprocatory carriage 6, which is supported, preferably, upon rolls 5, mounted on studs 4. The upper face of this carriage is formed in a series of steps, each of which is in length substantially one-half of the strand in the metal to be expanded and in depth is approximately equal to the depth of the strand.

The metal to be expanded, which is now formed of a slitted sheet, is arranged in a vertical plane between the edges and faces of the carriage 6 and the beam 2, and to provide space for the metal the face of the carriage 6 is recessed at 6ª. The lower edge of the metal sheet is supported on the carriage, preferably by roller-disks 7, which are journaled to the carriage and project slightly above the lower edge of the recess. Thus when not otherwise connected the slitted sheets in the carriage 6 are adapted to move independently.

Adjacent to each of the steps in the carriage 6 is an expanding-finger 21. Each of these fingers is mounted upon a vertical arbor 20, which passes through and is journaled in bearings in the beam 2, the finger being secured at the upper end of the arbor preferably by providing a split hub 24 and a clamping-bolt 24ª. The arbor is so located that the end of the finger in turning will travel through a path closely approximating an arc centered in the vertical edge of one of the steps. Furthermore the point of bearing portion of the finger is in normal position substantially in the vertical plane of the next succeeding vertical step. Thus if the strand in the slitted metal is projected its full length beyond one of the vertical steps. The coöperating finger is arranged to bear at substantially the center of the strand, and in its movement this finger will bend said strand over the vertical edge of the step, while maintaining substantially its central position of bearing on the strand.

The shoulders of each of the steps in the carriage 6 are preferably formed by detachable hardened plates 23, secured in position by suitable means, such as screw 23$^a$. The end or bearing portion of the finger 21 is also preferably provided with a hardened roller 22, which is adapted to engage with the strand. The plates 23 also preferably project and overhang the recess 6$^a$ and have their edges slightly beveled, as shown in Figs. 3 and 8. This is for the purpose of forming retaining-ledges for engagement with the strands of slitted metal, which latter is to this end not only slitted, but also indented, so that each strand has one edge thereof projected beyond the edge of the adjacent strand. Thus when the slitted metal is arranged upon the carriage 6 the edge of the strand immediately below each of the plates 23 will engage with the projecting shoulder 23$^b$ of said plate and will be held from upward movement.

By reason of the reëngagement of the arbors 20 each of the fingers 21 will in its normal position be above the arbor next succeeding the finger. This limits the thickness of a portion of the finger; but the requisite strength may be obtained by an increase in breadth, and to further increase the strength of the finger bearing-plates 25 are arranged above each of said plates, being preferably in the form of brackets secured to the beam 2 by bolts 25$^a$. The brackets 25 also form means for mounting detents 26, which are employed for holding the slitted sheet stationary during the return movement of the carriage 6, said detents being preferably of the following construction:

27 is an arm or shank adjustably connected to the bracket 25 by bolt 27$^a$ engaging a slot-bearing 27$^b$ in the shank.

28 is a cylindrical housing secured to the shank 27. Within this housing is inserted a plunger 29, the lower ends of which cross between points 30 and 31, which are adapted to engage with the strands of the metal. These points are adjustably secured in particular angular relation to the metal by a bolt 33, which telescopically engages the housing in the plunger 29 and is secured thereto by pins 35, engaging with slots in the plunger. The bolt 33 has a thread-shank passing through an aperture in the housing 28 and engaging with a nut 34, by means of which said bolt may be held in position. Thus when the nut 34 is released the plunger 29 may be placed in any desired position of adjustment and then held from rotation by clamping the nut 34. The plunger 29 is pressed downward by the tension of a spring 32, bearing against the bolt 33 and the beam resting in the plunger 29.

The machine is preferably provided with one of the detents 26 for each of the strands of the slitted sheet, or the number of these detents may be varied, as desired, it being only necessary to provide a sufficient number to hold the sheet stationary during the return movement of the carriage. The detents may be accurately positioned by adjustment of the shanks 27 and the rotary adjustment of the plungers 29, the arrangement being such that when the carriage 6 moves forward to its limit the detents will engage with the bended portion of the strand adjacent to the shoulder on the plate 23. To permit this, said plate 23 is preferably notched at 23$^c$, so as to provide clearance for the detents.

In the operation of the machine the carriage 6 and the fingers 21 are actuated alternately and preferably by the following mechanism: A is pinioned upon the shaft $a$, journaled in bearings in the frame, which shaft is driven by connection with any suitable source of power. The pinion A is arranged to mesh with two adjacent mutilated gears 12 and 18, which are respectively mounted upon the shaft journaled in bearings on the frame. At the bearings this shaft is connected, respectively, to cranks 11 and 17, which in turn are connected by links 10 and 16 with rock-arms 9 and 14 upon rock-sleeve 9$^a$ and rock-shaft 14$^a$. The rock-sleeve 9$^a$ has secured thereto the rock-arm 8, which is connected by a link 8$^a$ with the reciprocatory carriage 6. The rock-sleeve 14$^a$ has mounted thereon the gear-segment 15, which meshes with a rack 15$^a$, secured to the reciprocatory bar 13. This bar 13 is connected to each of a series of rock-arms 19, which are respectively attached to the arbors 20. The rack 15$^a$ is also attached to the rock-arm 29$^a$, which serves to guide it in its reciprocatory movement, and in order to provide for the necessary lateral movement caused by the connections between the bar 13 and the rock-arms the teeth of the rack 15$^a$ are made longer than the teeth 15$^b$ of the segment 15.

The mechanism just described is intended to alternately actuate the carriage 6 and the reciprocatory bar 13, which latter causes a simultaneous operation of all of the fingers 21. The alternate movement is due to the interruption due to their mutilated portions in each of the gears 12 and 18, which after each revolution temporarily throws them out of mesh with the actuating-pinion A. The gears are thrown into mesh again through the operation of lugs 40 and 41, respectively connected to the adjacent bases of the gears 18 and 12, which lugs are so proportioned that the completion of the rotation of one of said gear-wheels will cause its lug to actuate the lug of the other wheel sufficiently to reëngage said gear with the pinion. Said reëngaged gear-wheel will then be actuated, while the other gear-wheel rests with its mutilated portion opposite the pinion until the reëngaged wheel revolves sufficiently to repeat the operation of reëngaging and disengaging. As soon as said gear is thus thrown into mesh it will revolve under the actuation of the pinion A through nearly another revolution, and in its final movement will in turn actuate the other gear to throw it into mesh.

From the description already given the operation of the machines will be understood; but, in brief summary, the complete operation is as follows: Movement being imparted to the mechanism through the drive connection with the shaft $a$, the carriage 6 and fingers 21 will be alternately actuated, as already described. The slitted sheet of metal which is operated upon is engaged with the carriage by passing it in the recess $6^a$ between said carriage and the beam 2 and feeding it longitudinally over the rolls 7 until the forward end of the upper edge of the sheet projects beyond the first step 23 in the beam. When in this position, the next succeeding operation of the fingers 21 will bend the strand over the edge of the abutment 23, and in the succeeding forward movement of the carriage 6 this bended strand will cause the sheet to travel forward with the carriage until the strand is engaged with the detent 26. In the return movement of the carriage the detent will hold the sheet, so that by the time the carriage is in its normal position another strand will project beyond the abutment 23.

As has been stated, the fingers 21 operate upon the strands at the middle thereof and in swinging will bend said strand about the vertical edge of the abutment. At the same time each strand actuated by a finger is bent backward from the point of contact with the finger, this being due to the fact that the turning of the strand is attached to the center of the next adjacent strand, and is consequently held back. It is evident that the portions of the strand intermediate the points of bending will remain straight, there being no tendency to bend or kink said portions, as is sometimes the case where the metal is simultaneously cut and expanded by a die. It will also be understood that any desired length may be given to the strands by suitable adjustment and through fingers 21. Such an adjustment is provided for by forming the rock-arm 14 with an adjustable pivot or crank pin for connecting with the link 16 and also by making the link 16 adjustable, as by means of a turnbuckle, as shown in the drawings, or other suitable means.

Each succeeding step after the initial operation of the machine will throw into action another expander until the whole number are in operation, after which the entire series of expanders operates successively until the end of the sheet is reached.

For lubricating the mechanism a series of oil-cups 36 are preferably supported by the brackets 25 and arranged to discharge oil upon the fingers 21.

I claim—

1. In an expanding-machine the combination with an abutment of means for advancing a slitted sheet to project a strand thereof beyond said abutment and means for bending said strand about the end of said abutment.

2. In an expanding-machine the combination with an abutment of means for advancing a slitted and indented sheet to project a strand thereof beyond said abutment, means for bending said strand over the end of said abutment and a shoulder for engaging with an indentation of said sheet to retain the latter from displacement.

3. In an expanding-machine the combination of means for advancing by steps a slitted and indented sheet, means for successively bending the strands in longitudinal series in said sheets during the interval of rest and an abutment adjacent to the path of said series of strands forming a shoulder over which they are successively bent and engaging with the indentation of an adjacent strand to hold said sheet from displacement.

4. In an expanding-machine the combination with an abutment of means for advancing the slitted sheet by the length of one strand beyond said abutment, and a lateral movable finger for engaging said strand intermediate its ends and bending the same over said abutment, said finger being adapted to simultaneously bend said strand at the point of bearing thereon.

5. In an expanding-machine the combination with an abutment of means for advancing a slitted sheet by the length of a strand beyond said abutment and a lateral movable finger for engaging said strand at approximately the middle thereof, said finger being adapted to simultaneously bend said strand over said abutment and to form a return bend therein at the point of bearing of the finger.

6. In an expanding-machine the combination with an abutment and means for advancing a slitted sheet by the length of a strand beyond said abutment and a finger for engaging said strand approximating in its movement an arc centering in the edge of said abutment whereby said strand is simultaneously bent over said abutment and returning bent over said finger and the point of bearing of the latter remains substantially at the middle of the strand.

7. In an expanding-machine the combination with a stepped abutment of means for advancing a slitted sheet to project the strands thereof beyond adjacent steps in said abutment and a series of fingers adapted to simultaneously bear at the middle of adjacent strand and deflect the same laterally whereby the strands are simultaneously bent over said abutment and return bent over said finger.

8. In an expanding-machine the combination with a stepped abutment of means for intermittently advancing a slitted sheet longitudinally thereof to project the strands beyond the steps in said abutment and alternately-operating means for simultaneously laterally deflecting the middle of each strand to bend the same at a point of bearing and over the end of the corresponding step in the abutment.

In testimony whereof I affix my signature in presence of two witnesses.

CHARLES J. W. HAYES.

Witnesses:
JAS. P. BARRY,
H. C. SMITH.